(12) United States Patent
Raghavan et al.

(10) Patent No.: US 11,950,184 B2
(45) Date of Patent: Apr. 2, 2024

(54) ZONE IDENTIFICATION (ID) FOR WIRELESS SIDELINK COMMUNICATIONS

(71) Applicant: QUALCOMM Incorporated, San Diego, CA (US)

(72) Inventors: Vasanthan Raghavan, West Windsor Township, NJ (US); Tao Luo, San Diego, CA (US); Sony Akkarakaran, Poway, CA (US); Junyi Li, Franklin Park, NJ (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/193,400

(22) Filed: Mar. 5, 2021

(65) Prior Publication Data

US 2021/0392580 A1 Dec. 16, 2021

Related U.S. Application Data

(60) Provisional application No. 63/039,392, filed on Jun. 15, 2020.

(51) Int. Cl.
*H04W 52/02* (2009.01)
*H04L 5/00* (2006.01)
(Continued)

(52) U.S. Cl.
CPC ....... *H04W 52/0219* (2013.01); *H04L 5/0048* (2013.01); *H04W 36/0009* (2018.08);
(Continued)

(58) Field of Classification Search
CPC ....... H04W 4/40–48; H04W 76/20–28; H04W 88/185; H04W 76/00–28; H04L 5/0048
See application file for complete search history.

(56) References Cited

U.S. PATENT DOCUMENTS

2012/0275364 A1 11/2012 Anderson et al.
2012/0275365 A1* 11/2012 Anderson ........... H04W 68/025
370/311
(Continued)

FOREIGN PATENT DOCUMENTS

WO 2019160496 A1 8/2019

OTHER PUBLICATIONS

International Search Report and Written Opinion—PCT/US2021/036871—ISA/EPO—dated Nov. 26, 2021.
(Continued)

*Primary Examiner* — San Htun
(74) *Attorney, Agent, or Firm* — Seyfarth Shaw LLP

(57) ABSTRACT

A sidelink user equipment (UE) receives a group wake-up signal (WUS) from a base station and decodes the group WUS based on zone identification (ID) information of the sidelink UE. A base station transmits a wake-up signal to a group of sidelink user equipments (UEs) and transmits zone ID information to the group. A group wake-up signal parameter is a function of the zone ID information. A base station generates a demodulation reference signal (DMRS) sequence, selects a port for a DMRS, and/or scrambles a control channel or a data channel based on a zone ID of a sidelink UE. A sidelink UE compares a zone ID of the sidelink UE with a zone ID of a neighbor UE and initiates a conditional handover to another cell when the zone ID of the sidelink UE differs from the zone ID of the neighbor UE.

14 Claims, 13 Drawing Sheets

(51) Int. Cl.
*H04W 36/00* (2009.01)
*H04W 36/32* (2009.01)
*H04W 72/25* (2023.01)
*H04W 72/40* (2023.01)
*H04W 76/28* (2018.01)

(52) U.S. Cl.
CPC ..... *H04W 36/00837* (2018.08); *H04W 36/32* (2013.01); *H04W 52/0229* (2013.01); *H04W 72/25* (2023.01); *H04W 72/40* (2023.01); *H04W 76/28* (2018.02)

(56) References Cited

U.S. PATENT DOCUMENTS

| | | | |
|---|---|---|---|
| 2012/0275366 A1* | 11/2012 | Anderson | H04W 52/0219 370/311 |
| 2013/0272182 A1* | 10/2013 | Li | H04W 74/0833 370/311 |
| 2014/0113674 A1* | 4/2014 | Joseph | H04W 4/021 455/519 |
| 2016/0100294 A1* | 4/2016 | Ruelke | H04W 72/51 455/518 |
| 2016/0198316 A1* | 7/2016 | Lakshmi Narayanan | H04L 41/0668 370/312 |
| 2017/0325167 A1* | 11/2017 | Lu | H04W 52/0235 |
| 2018/0279274 A1* | 9/2018 | Sun | H04W 72/23 |
| 2019/0052436 A1* | 2/2019 | Desai | H04L 5/0055 |
| 2019/0090191 A1* | 3/2019 | Liu | H04W 52/0229 |
| 2019/0098574 A1* | 3/2019 | Huang | H04W 4/06 |
| 2019/0349856 A1* | 11/2019 | Liu | H04W 52/0216 |
| 2020/0029302 A1 | 1/2020 | Cox et al. | |
| 2020/0037247 A1 | 1/2020 | Liao et al. | |
| 2020/0396681 A1* | 12/2020 | Murali | H04L 9/0825 |
| 2021/0037470 A1* | 2/2021 | Åström | H04W 52/0229 |

OTHER PUBLICATIONS

Partial International Search Report—PCT/US2021/036871—ISA/EPO—dated Oct. 5, 2021.

* cited by examiner

ZONE IDENTIFICATION (ID) FOR WIRELESS SIDELINK COMMUNICATIONS

CROSS-REFERENCE TO RELATED APPLICATION

The present application claims the benefit of U.S. Provisional Patent Application No. 63/039,392, filed on Jun. 15, 2020, and titled "ZONE ID FOR WIRELESS SIDELINK COMMUNICATIONS," the disclosure of which is expressly incorporated by reference it its entirety.

FIELD OF THE DISCLOSURE

Aspects of the present disclosure generally relate to wireless communications, and more particularly to techniques and apparatuses for use of zone identification (ID) in wireless sidelink communications.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink UEs, such as vehicles, may communicate directly with each other using device-to-device (D2D) communications over a D2D wireless link. These communications can be referred to as sidelink communications.

As the demands for sidelink communications increase, different V2X communications systems compete for the same wireless communications resources. Moreover, some sidelink UEs may be power limited. Accordingly, there is a need to improve the efficiency of sidelink wireless communications.

SUMMARY

According to an aspect of the present disclosure, a method of wireless communication by a sidelink user equipment (UE) includes receiving a group wake-up signal (WUS) from a base station. The method also includes decoding the group WUS based on zone identification (ID) information of the sidelink UE.

According to another aspect of the present disclosure, a sidelink user equipment (UE) for wireless communication includes means for receiving a group wake-up signal (WUS) from a base station. The sidelink UE also includes means for decoding the group WUS based on zone identification (ID) information of the sidelink UE.

In another aspect, an apparatus for wireless communication at a sidelink user equipment (UE) includes a processor and a memory coupled to the processor. Instructions stored in the memory, when executed by the processor, cause the apparatus to receive a group wake-up signal (WUS) from a base station. The instructions also cause the apparatus to decode the group WUS based on zone identification (ID) information of the sidelink UE.

In yet another aspect, a non-transitory computer-readable medium records program code. The program code is executed by a sidelink user equipment (UE) and comprises program code to receive a group wake-up signal (WUS) from a base station. The program code also includes program code to decode the group WUS based on zone ID information of the sidelink UE.

According to another aspect, a method of wireless communication by a base station includes generating a demodulation reference signal (DMRS) sequence based on a zone identification (ID) of a sidelink user equipment (UE). The method also includes transmitting the DMRS sequence to the sidelink UE.

In another aspect, a method of wireless communication by a base station includes selecting a port for a demodulation reference signal (DMRS) based on a zone identification (ID) of a sidelink user equipment (UE). The method further includes transmitting the DMRS with the port.

In yet another aspect, a method of wireless communication by a base station includes scrambling a control channel or a data channel based on a zone identification (ID) of a sidelink user equipment (UE). The method also includes transmitting the control channel or data channel to the sidelink UE.

In another aspect of the present disclosure, a method of wireless communication by a sidelink user equipment (UE) includes comparing a zone identification (ID) of the sidelink UE with a zone ID of a neighbor UE. The method also includes initiating a conditional handover to a different cell when the zone ID of the sidelink UE differs from the zone ID of the neighbor UE.

In another aspect of the present disclosure, a sidelink user equipment (UE) for wireless communication includes means for comparing a zone ID of the sidelink UE with a zone ID of a neighbor UE. The method also includes means for initiating a conditional handover to another cell when the zone ID of the sidelink UE differs from the zone ID of the neighbor UE.

In another aspect of the present disclosure, an apparatus for wireless communication at a base station includes a processor and a memory coupled to the processor. Instructions stored in the memory, when executed by the processor, cause the apparatus to transmit a wake-up signal (WUS) to a group of sidelink user equipments (UEs). The instructions also cause the apparatus to transmit zone ID information to the group of sidelink UEs. A group wake-up signal parameter is a function of the zone ID information.

According to another aspect, an apparatus for wireless communication at a base station includes a processor and a memory coupled to the processor. Instructions stored in the memory, when executed by the processor, cause the apparatus to generate a demodulation reference signal (DMRS) sequence based on a zone ID of a sidelink user equipment (UE). The instructions also cause the apparatus to transmit the DMRS sequence to the sidelink UE.

In still another aspect, an apparatus for wireless communication at a base station includes a processor and a memory coupled to the processor. Instructions stored in the memory, when executed by the processor cause the apparatus to select a port for a demodulation reference signal (DMRS) based on a zone ID of a sidelink user equipment (UE). The instructions also cause the apparatus to transmit the DMRS with the port.

In yet another aspect, an apparatus for wireless communication at a base station includes a processor and a memory coupled to the processor. Instructions stored in the memory, when executed by the processor, cause the apparatus to scramble a control channel or a data channel based on a zone ID of a sidelink user equipment (UE). The instructions also cause the apparatus to transmit the control channel or data channel to the sidelink UE.

In another aspect of the present disclosure, an apparatus for wireless communication at a sidelink user equipment (UE) includes a processor and a memory coupled to the processor. Instructions stored in the memory, when executed by the processor, cause the apparatus to compare a zone identification (ID) of the sidelink UE with a zone ID of a neighbor UE. The instructions also cause the apparatus to initiate a conditional handover to a different cell when the zone ID of the sidelink UE differs from the zone ID of the neighbor UE.

In another aspect of the present disclosure, a non-transitory computer-readable medium records program code. The program code is executed by a base station and comprises program code to transmit a wake-up signal (WUS) to a group of sidelink user equipments (UEs). The program code also includes program code to transmit zone ID information to the group of sidelink UEs. A group wake-up signal parameter is a function of the zone ID information.

According to another aspect, a non-transitory computer-readable medium records program code. The program code is executed by a sidelink user equipment (UE) and comprises program code to generate a demodulation reference signal (DMRS) sequence based on a zone ID of a sidelink UE. The program code also includes program code to transmit the DMRS sequence to the sidelink UE.

In still another aspect, a non-transitory computer-readable medium records program code. The program code is executed by a sidelink user equipment (UE) and comprises program code to select a port for a demodulation reference signal (DMRS) based on a zone ID of a sidelink user equipment (UE). The program code also includes program code to transmit the DMRS with the port.

In yet another aspect, a non-transitory computer-readable medium records program code. The program code is executed by a sidelink user equipment (UE) and comprises program code to scramble a control channel or a data channel based on a zone ID of a sidelink user equipment (UE). The program code also includes program code to transmit the control channel or data channel to the sidelink UE.

In another aspect of the present disclosure, a non-transitory computer-readable medium records program code. The program code is executed by a sidelink user equipment (UE) and comprises program code to compare a zone ID of the sidelink UE with a zone ID of a neighbor UE. The program code also includes program code to initiate a conditional handover to another cell when the zone ID of the sidelink UE differs from the zone ID of the neighbor UE.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
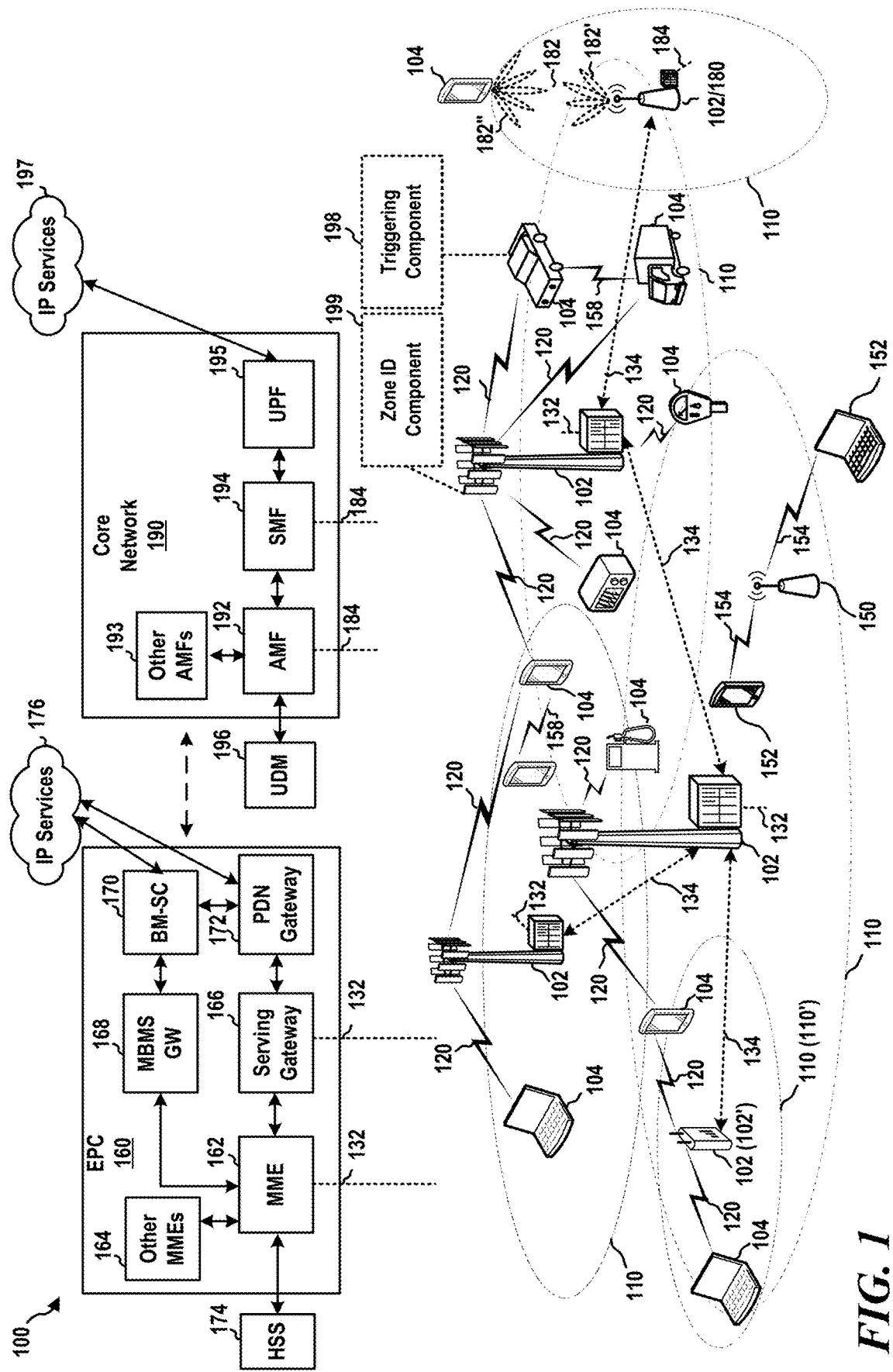
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

A zone identification (ID) is a concept in sidelink communications that is based on a physical location of a UE. Aspects of the present disclosure are directed to methods that leverage a zone ID of a UE in physical layer (PHY) protocol designs, for example, such as with millimeter wave (mmWave) communications. Some aspects that are considered include a group wake-up signal (WUS) for UE nodes in frequency bands such as mmWave (for example, frequency range 2 (FR2) or frequency range 4 (FR4) corresponding to 24.25-52.6 GHz and 52.6-114.25 GHz, respectively). More specifically, aspects of the present disclosure relate to conveying zone ID information to a base station or network for WUS parameter design.

Wake-up signals may improve power savings. For example, a UE may sleep by entering a connected mode discontinuous reception cycle (CDRX) to save power. A UE periodically wakes up from sleep and listens for a wake-up signal. If the UE does not receive a wake-up signal, the UE returns to sleep mode.

If UEs are waking up at different times, it may be difficult to establish sidelink communications between these UEs. According to aspects of the present disclosure, a base station or network aligns the sleep/wake-up cycle for UEs near one another. A zone ID may facilitate the alignment. To enable the alignment, a group WUS parameter used by the base station/network may be a function of the zone ID of the UEs.

The base station may convey zone ID information to the UE inside a physical downlink control channel (PDCCH) payload. Alternatively, the zone ID may be used to scramble some portion of a cyclic redundancy check (CRC) code.

According to aspects of the present disclosure, the base station and UE use the zone ID information to determine the WUS parameter in multiple ways. For example, a search space and time location to monitor for the WUS may be a function of the zone ID. Alternatively, the function could be explicit or implicit, and also dependent on other common UE parameters or capability information.

According to another aspect of the present disclosure, the zone ID information may be used for generating a demodulation reference signal (DMRS) sequence or selecting a port for a DMRS. Additionally, or alternatively, scrambling for control or data channels may be based on zone ID information.

A conditional handover (CHO) is defined as a UE having a network configuration for initiating access to a target cell based on configured condition(s). The usage of conditional handover is decided by the network. The UE evaluates when the condition is valid, for example, when a signal strength of a target cell exceeds a threshold. According to another aspect of the present disclosure, conditional handover may be triggered by a UE based on its own zone ID and by observing other sidelink UEs that advertise a different/same sidelink zone ID. This information may be an indirect indication that the base station serving the neighbor UEs has a better signal than the serving base station triggering a conditional handover process.

According to another aspect of the present disclosure, a conditional handover may be triggered based on advertised zone IDs of multiple other sidelink UEs that are in coverage. For example, when a signal strength of the neighbor UE's communications with the sidelink UE exceeds an appropriately configured signal level threshold, then it may be inferred that the signal strength between the sidelink UE and the neighbor cell base station could also be sufficiently good to warrant a cell handover. The threshold may be determined based on the signal strength between the neighbor UE and its base station and/or a signal strength of neighbor sidelink UE transmissions received at the sidelink UE.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., Si interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a sidelink UE, such as the UE 104, may trigger a conditional handoff based on zone information. The UE 104 may include a triggering component 198 configured to determine whether to initiate a conditional handover. Additionally, or alternatively, a base station, such as the base station 102 may include a zone ID component 199 configured to generate a data modulation reference signal (DMRS) sequence based on a zone ID, select a port for a DMRS based on a zone ID, scramble a control channel or data channel based on a zone ID, or wake up a group of UEs based on a zone ID.

Although the following description may be focused on 5G NR, it may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Figure 3:
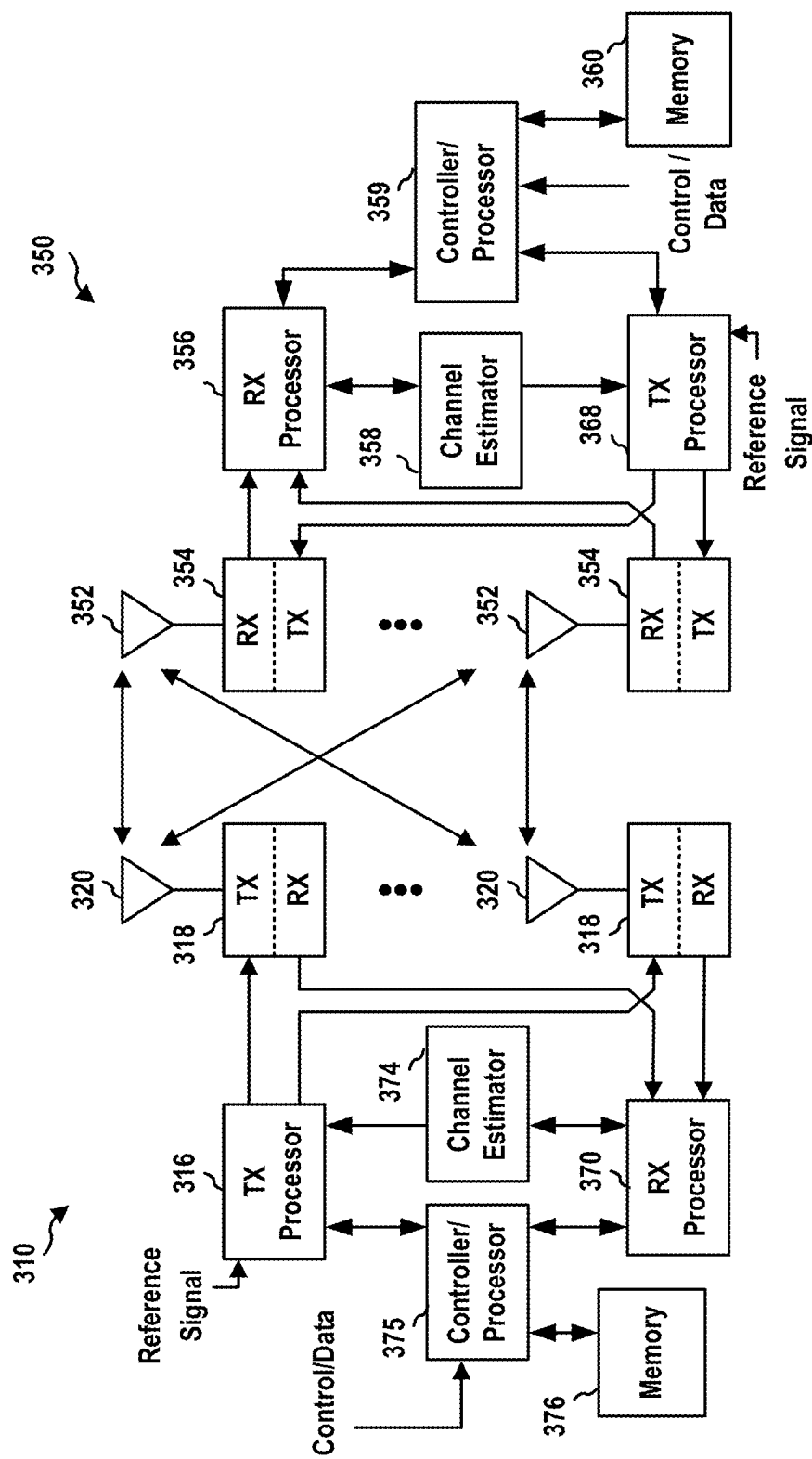
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the triggering component 198 and/or zone ID component 199 of FIG. 1. Additionally, at least one of the TX processor 316, the RX processor 370, and the controller/processor 375 may be configured to perform aspects in connection with triggering component 198 and/or zone ID component 199 of FIG. 1.

In some aspects, the base station 102, 310 and/or the UE 104, 350 may include means for receiving, means for decoding, means for transmitting, means for determining, means for generating, means for selecting, means for scrambling, means for comparing, and/or means for initiating. Such means may include one or more components of the base station 102, 310 and/or the UE 104, 350 described in connection with FIGS. 1 and 3.

Figure 4:
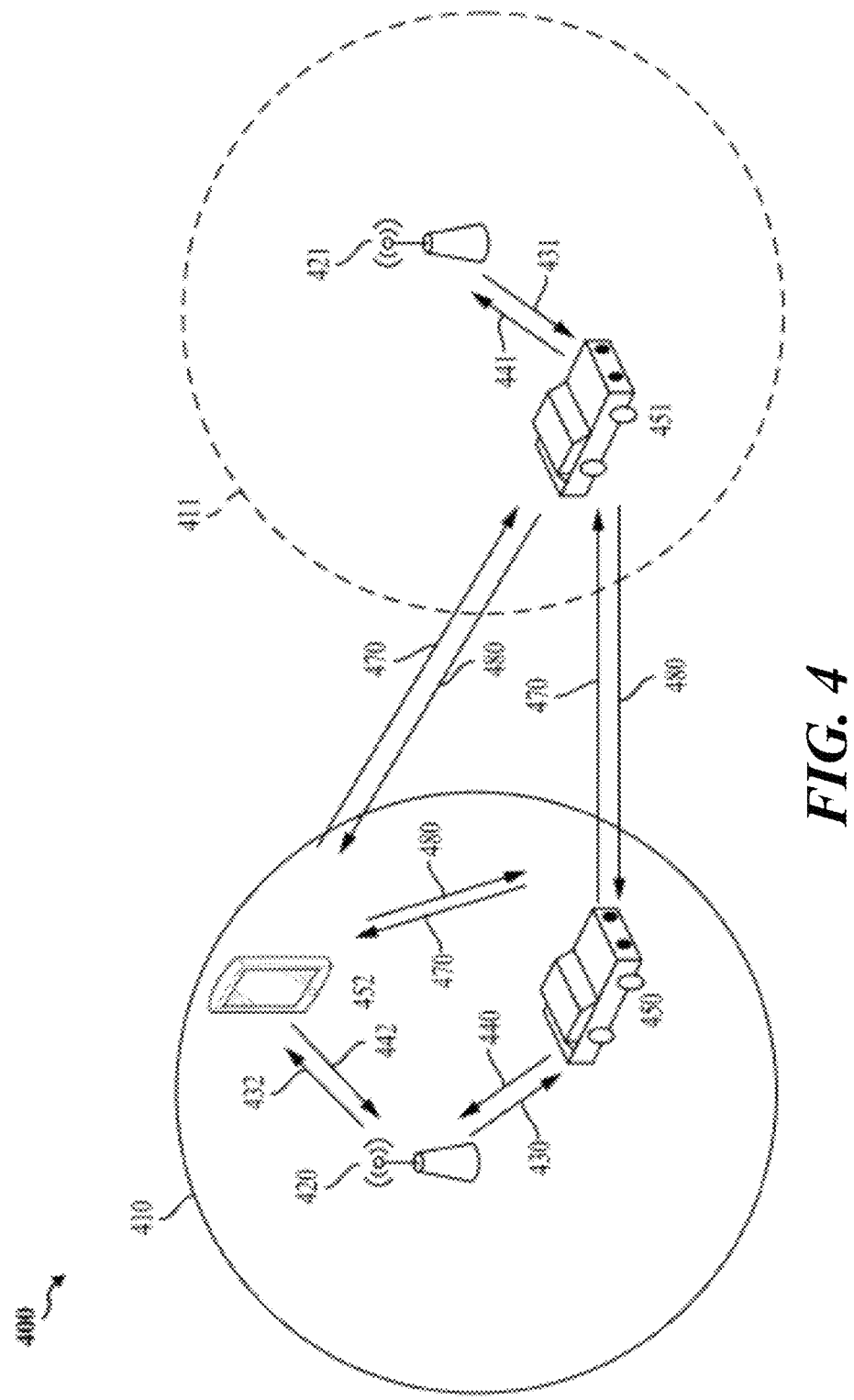
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

Figure 2:
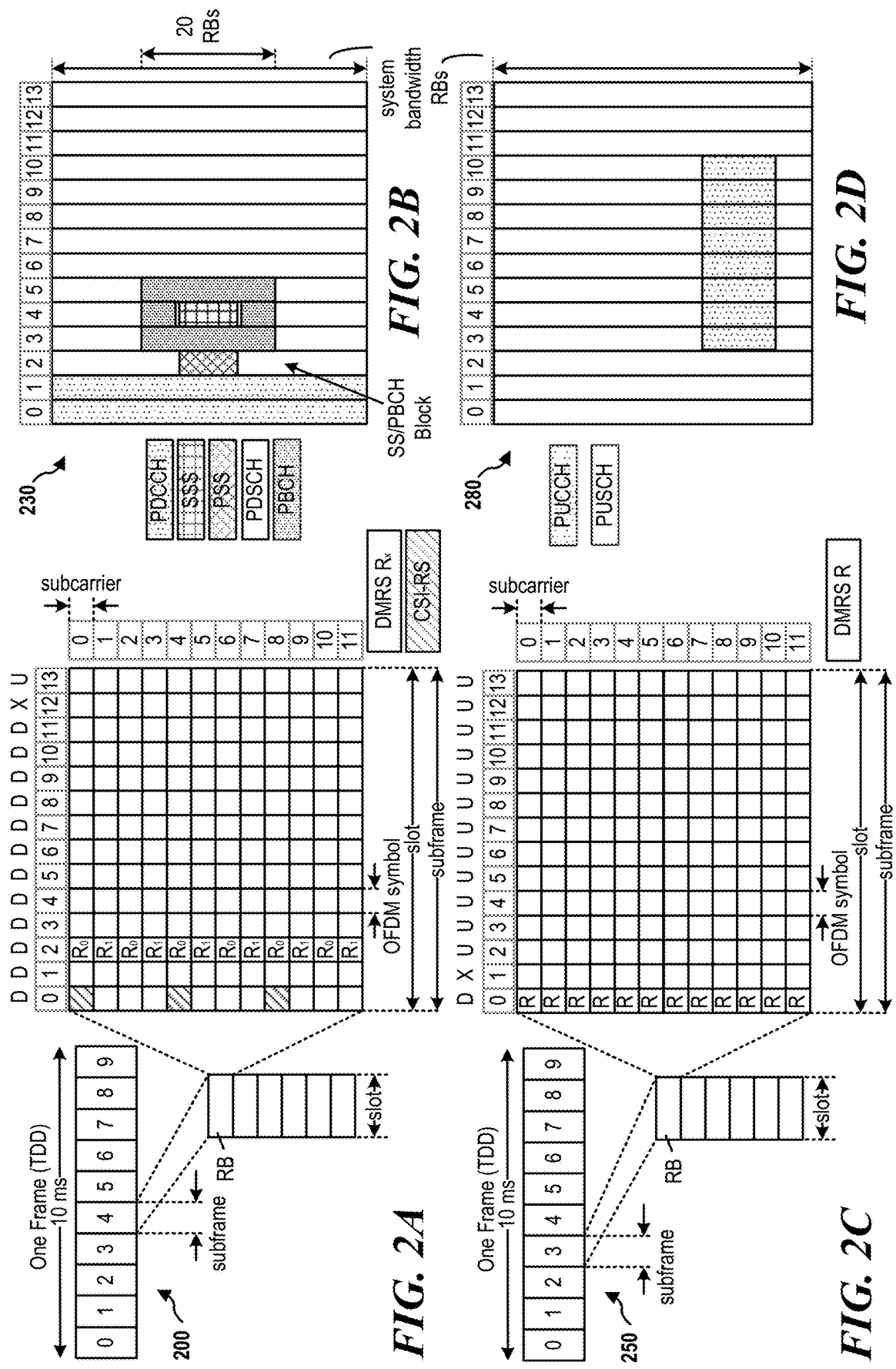
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more FDM channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
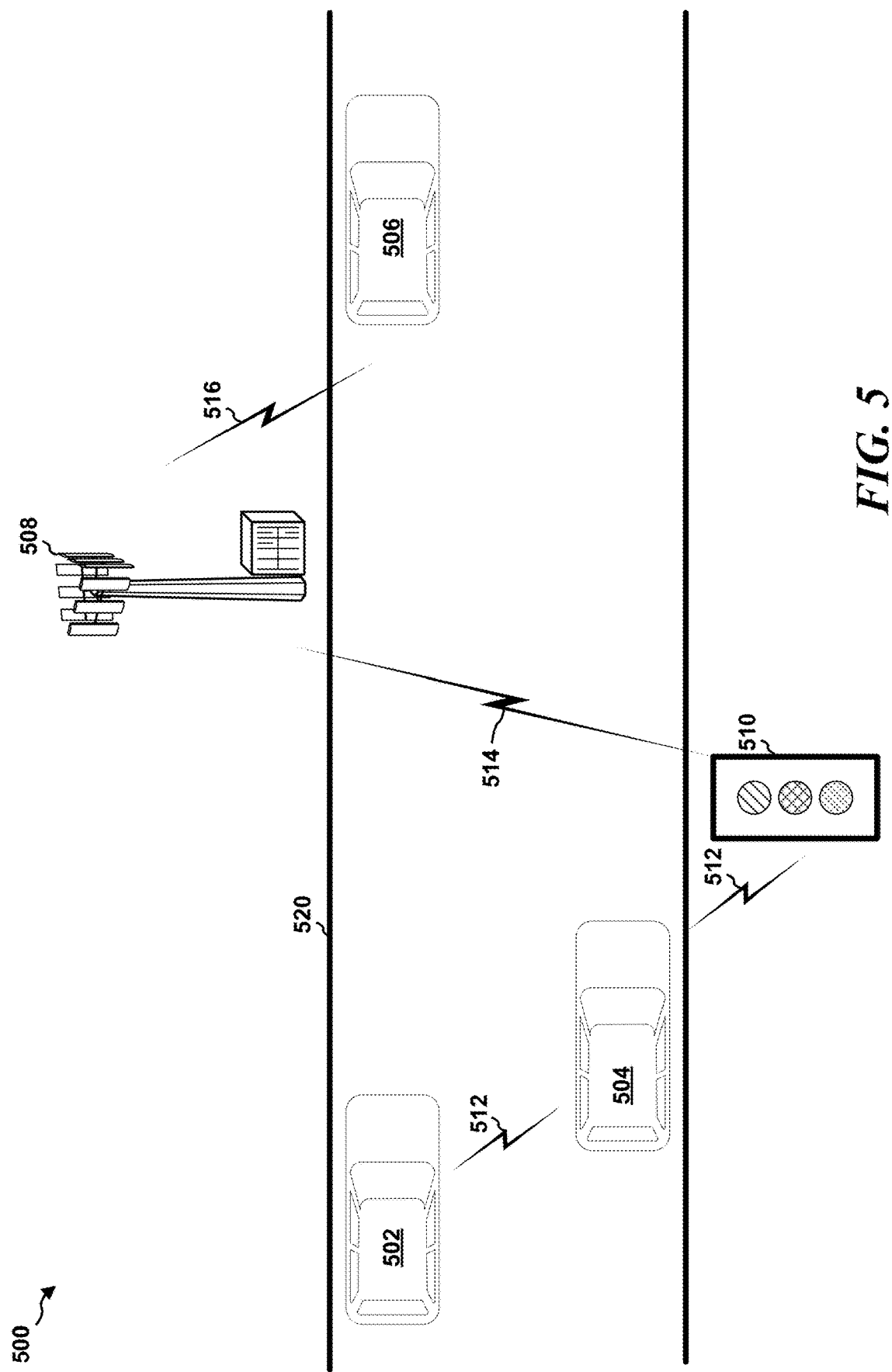
FIG. 5 is a block diagram illustrating an example of a vehicle-to-everything (V2X) system with a road side unit (RSU), according to aspects of the present disclosure.

FIG. 5 illustrates an example of a V2X system 500 with an RSU 510 according to aspects of the present disclosure. As shown in FIG. 5, a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Millimeter wave (mmWave) systems in 5G new radio (5G NR) include both relay and sidelink procedures. In general, relay procedures have been studied for systems such as sub-6 GHz, 4G, long-term evolution (LTE), device-to-device (D2D), vehicle-to-everything (V2X), etc. In contrast to sub-6 GHz relaying, mmWave brings a number of challenges, including more antenna elements, directional beams, power constraints, thermal constraints, and maximum permissible exposure (MPE) constraints. Although the present disclosure is primarily described with respect to mmWave, the present disclosure is also applicable to other systems, such as sub-6 GHz of 5G-NR, LTE, etc.

As described above, zone ID is a concept in sidelink communications that is based on a geographical/physical location of a UE. Aspects of the present disclosure are directed to methods that leverage a zone ID of a UE in physical layer (PHY) protocol designs, for example, such as with mmWave communications.

Some aspects that are considered include a group wake-up signal (WUS) for UE nodes in frequency bands, such as mmWave (for example, frequency range 2 (FR2) or frequency range 4 (FR4)). More specifically, aspects of the present disclosure relate to conveying zone ID information to a base station or network for WUS parameter design.

Wake-up signals help with power savings. Systems, such as mmWave, are particularly challenged with power use. To save power, a UE may enter a connected mode discontinuous reception cycle (CDRX). When data is available for communications with the UE, the UE should wake up. Thus, a UE periodically wakes up from sleep and listens for a WUS. If the UE does not receive a WUS indicating data is available, the UE returns to sleep mode. If the UE receives the WUS, the UE suspends its sleep cycle and monitors for control/data signals.

If UEs are waking up at different times, it may be difficult to establish a sidelink between these UEs. According to aspects of the present disclosure, a base station or network aligns the sleep/wake-up cycle for UEs near one another. A zone ID may facilitate the alignment. Thus, UEs near one another may establish a good quality sidelink between themselves.

Figure 6:
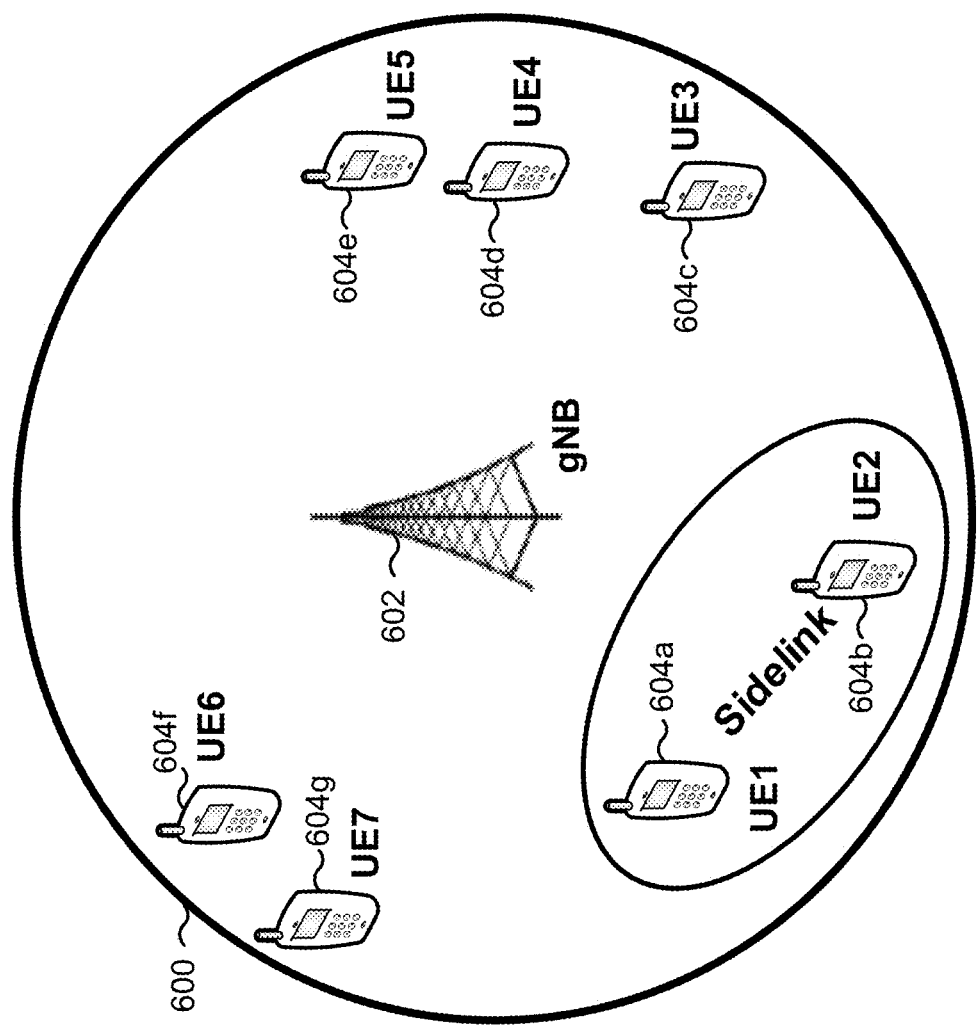
FIG. 6 is a diagram illustrating user equipments (UEs) in a coverage area of a base station, in accordance with various aspects of the present disclosure.

FIG. 6 is a diagram illustrating user equipments (UEs) in a coverage area 600 of a base station, in accordance with various aspects of the present disclosure. The coverage area 600 includes a central base station/5th generation node B (gNB) base station 602, and multiple UEs 604a-g. Although the following description and FIG. 6 are with respect to UEs connected to a single base station, some of the UEs may be connected to a different base station (not shown). In FIG. 6, all the UEs 604a-g in the cell are connected to the base station 602. While the base station 602 knows the identifiers of each UE 604a-g (for example, cell radio network temporary identifier (C-RNTI), SAI-temporary mobile subscriber identity (S-TMSI) or temporary identifier (TIN)), as well as their approximate locations, the UEs do not know of a neighbor UE's existence until they autonomously discover each other or they are informed of the neighbor UE's existence by the base station 602. In the scenario of autonomous discovery, some UEs 604a-g may perform beam scanning and learn of each other's existence (as other UEs listen). For both autonomous discovery and network-based discovery, the UEs should be awake at the same time-periods to establish communications with one another. Thus, in FIG. 6, although UE1 604a and UE2 604b are near one another, they may not know of each other's existence. Similarly, UE3 604c, may be unaware of neighbor UE4 604d and neighbor UE5 604e, while UE6 604f may be unaware of neighbor UE7 604g. In FIG. 6, UE1 604a is attempting to establish a sidelink with UE2 604b.

A sidelink zone ID divides the earth into small grids indexed in a well-defined way, with an N-bit index that wraps around after some zones. A distance between sidelink UEs can be inferred from their respective zone ID. The UEs in different zones may be geographically far apart. The UEs in the same zone are geographically close. For example, let UEA and UEB be in the same zone. If the zone width equals 500 m, then the maximum inter-UE (UEA to UEB) separation distance equals 500 m. If UEA and UEB are four zones apart, then the maximum inter-UE (UEA to UEB) separation distance equals 2000 m.

According to an aspect of the present disclosure, multiple UEs within a same zone ID (or UEs geographically close to each other) may be woken up at a same time interval to assist with their mutual discovery. UEs in contiguous zones may be geographically close to each other. Thus, rather than generating a separate WUS parameter for each zone ID, WUSs for the geographically proximate UEs may be clustered together. The UEs will wake up and sleep at the same time, increasing the probability of establishing a sidelink between them. The base station may be aware of whether UEs are near one another from coarse positioning information reported by the UEs.

To enable alignment, a group WUS parameter used by the base station/network may be a function of the zone ID of the UEs. A WUS has multiple parameters, for example, a waveform to use, a code parameter to generate a waveform, etc. Any of these WUS parameters may be based upon the zone ID.

Figure 7:
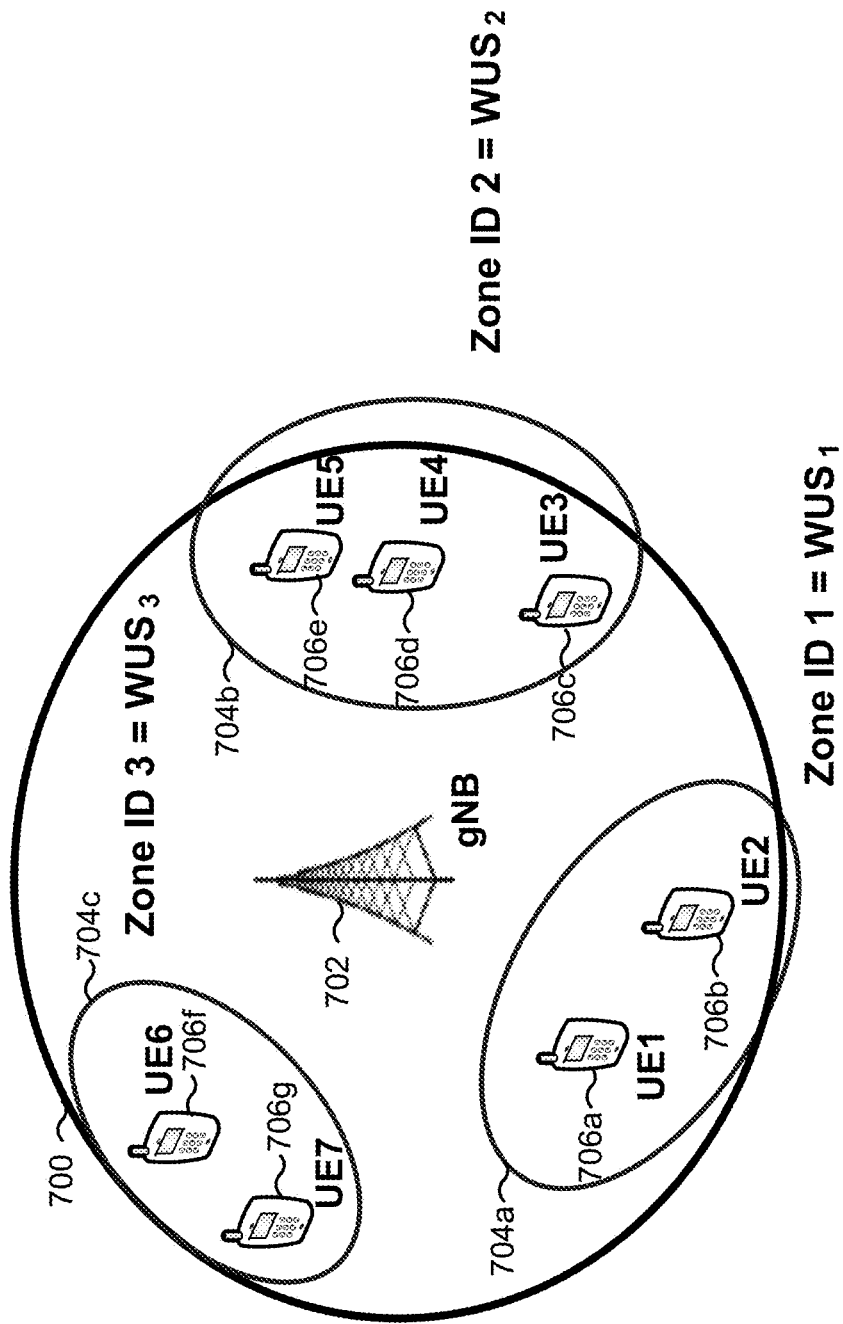
FIG. 7 is a diagram illustrating user equipment (UE) zones, in accordance with various aspects of the present disclosure.

FIG. 7 is a diagram illustrating user equipment (UE) zones, in accordance with various aspects of the present disclosure. A base station coverage area 700 includes a base station (e.g., gNB) 702 and three different zone IDs 704a-c. In FIG. 7, UE1 706a and UE2 706b have the same zone ID 704a (e.g., Zone ID 1), and thus the same wake-up signal (e.g., WUS 1). Similarly, UE3 706c, UE4 706d, and UE5 706e have the same zone ID 704b (e.g., Zone ID 2) and the same wake-up signal (e.g., WUS 2). UE6 706f and UE7 706g are near one another and accordingly have the same zone ID 704c (e.g., Zone ID 3) and wake-up signal (e.g., WUS 3). Although FIG. 7 shows all of the UEs 706a-g with a same cell communicating with a single base station (e.g., gNB) 702, any of the UEs 706a-g could be communicating with a different base station (not shown). Moreover, proximate UEs in different zones may have the same WUS, although not depicted in FIG. 7. For example, UE2 706b and UE3 706c could have the same WUS.

As indicated above, FIGS. 6-7 are provided as examples. Other examples may differ from what is described with respect to FIGS. 6-7.

According to aspects of the present disclosure, the base station conveys zone ID information to the UE inside a physical downlink control channel (PDCCH) payload. Alternatively, the zone ID may be used to scramble some portion of a cyclic redundancy check (CRC) code. For example, a CRC mask may be generated from the zone ID.

According to aspects of the present disclosure, the base station and UE use the zone ID information to determine the WUS parameter in multiple ways. For example, a search space and time location to monitor for the WUS may be a function of the zone ID. Alternatively, the function could be explicit or implicit, and also dependent on other common UE parameters (such as power, thermal, or exposure parameters) or capability information (such as a number of UE RF chains or a UE processing capability). For example, if a UE does not want to establish a sidelink, that information may be incorporated into the WUS generation.

According to another aspect of the present disclosure, the zone ID information may be used for generating a demodulation reference signal (DMRS) sequence or selecting a port for a DMRS. Additionally, or alternatively, scrambling for control or data channels may be based on zone ID information. For example, some frequencies are available at only certain locations (for example, certain zone IDs).

A conditional handover (CHO) is defined as the UE having a network configuration for initiating access to a target cell based on certain configured condition(s). The usage of conditional handover is decided by the network. The UE evaluates when the condition is valid, for example, when a signal strength (for example, reference signal received power (RSRP)) of a target cell exceeds a threshold.

According to another aspect of the present disclosure, a conditional handover may be triggered by a UE based on its own zone ID and by observing other sidelink UEs that advertise a different sidelink zone ID. The other sidelink UEs are in a different cell, which may be an indirect indication that the base station serving the neighbor UEs has a better signal than the serving base station. Accordingly, the UE may trigger a conditional handover process. Although a comparison with a single neighbor UE may be enough to trigger the conditional handover, multiple neighbor UEs with a different zone ID may provide a better indication of when to trigger the conditional handover.

According to another aspect of the present disclosure, a conditional handover may be triggered based on advertised zone IDs of multiple other sidelink UEs that are in coverage. For example, when a signal strength of the neighbor UE's communications with the sidelink UE exceeds a threshold, this could be an indirect indication that a cell handover is likely to help. The threshold may be determined based on the signal strength between the neighbor UE and its base station and/or a signal strength of neighbor sidelink UE transmissions received at the sidelink UE.

Figure 8:
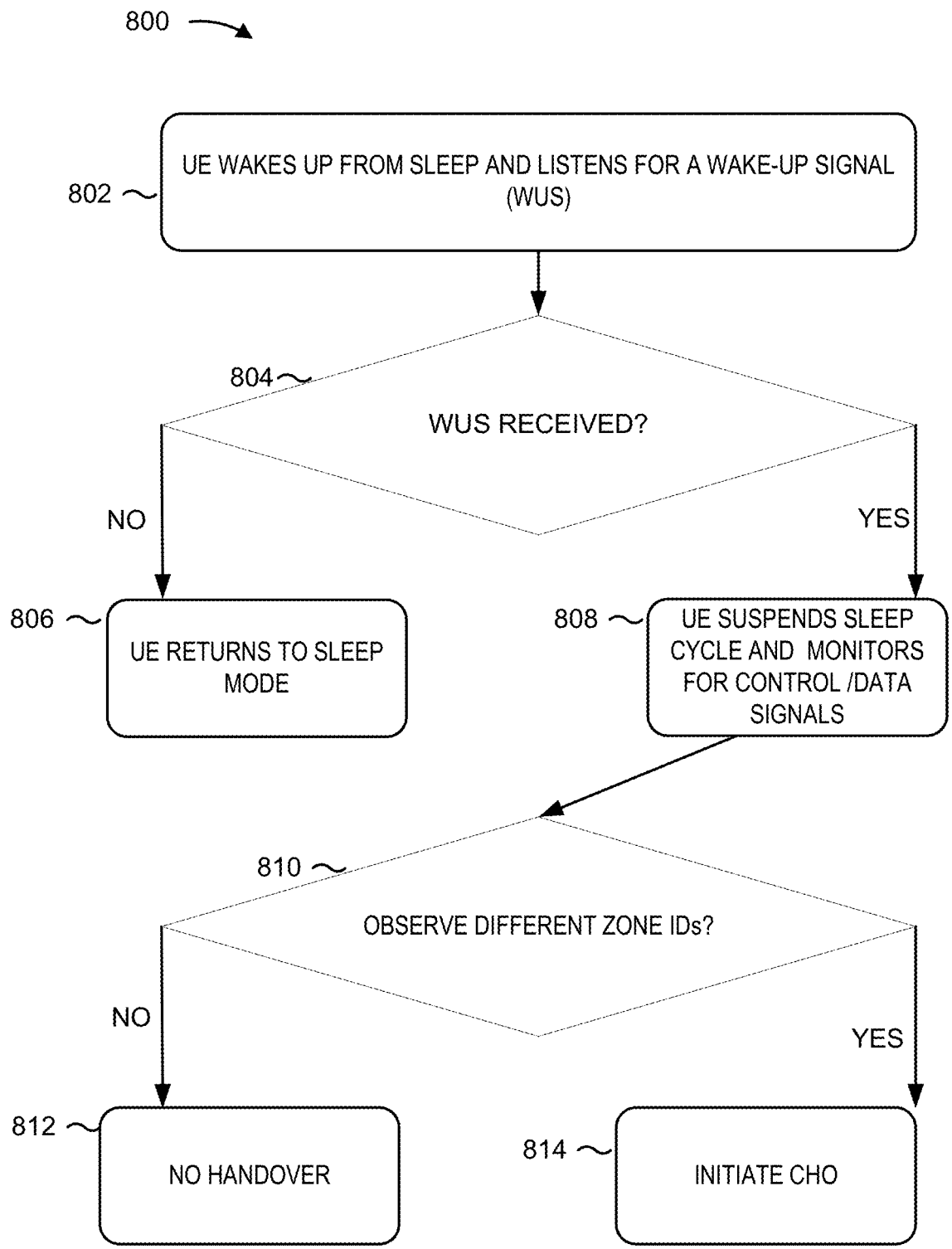
FIG. 8 is a flow diagram illustrating user equipments (UEs) using zone identifications (IDs) in conjunction with a group wake-up signal (WUS) and conditional handover (CHO), in accordance with various aspects of the present disclosure.

FIG. 8 is a flow diagram 800 illustrating user equipments (UEs) using zone IDs in conjunction with a group wake-up signal (WUS) and conditional handover (CHO), in accordance with various aspects of the present disclosure. The flow diagram 800 begins when a UE, such as one of the UEs 706a-g in FIG. 7, wakes up from sleep and listens for a wake-up signal in block 802. In block 804, it is determined whether a wake-up signal (WUS) was received. If a WUS was not received, in block 806, the UE returns to sleep mode.

If a wake-up signal was received, then in block 808, the UE suspends its sleep cycle and monitors for control/data signals in block 808. The control and data signals may be received from the base station 702 of FIG. 7. The control and data signals may include a zone ID as part of the PDCCH payload.

At this point, a UE 706c may observe zone IDs advertised by other sidelink UEs 706d, 706e. If the observed zone IDs differ from the zone ID of the UE 706c, the UE 706c may be a candidate for a conditional handover (CHO). The information may be an indirect indication that the gNB serving the other sidelink UEs 706d, 706e has a better signal than the serving gNB, triggering the CHO process. At block 810, the UE 706c evaluates whether a CHO should occur based on whether its zone ID is different from the observed zone IDs from other UEs 706d, 706e. If a conditional handover is not needed, in block 812, there is no change. However, if a conditional handover is needed, in block 814 a CHO is performed. The UE 706c may be added to a group WUS associated with the other UEs 706d, 706e. A UE added to a group WUS will then wake up with the other UEs in the group.

Figure 9:
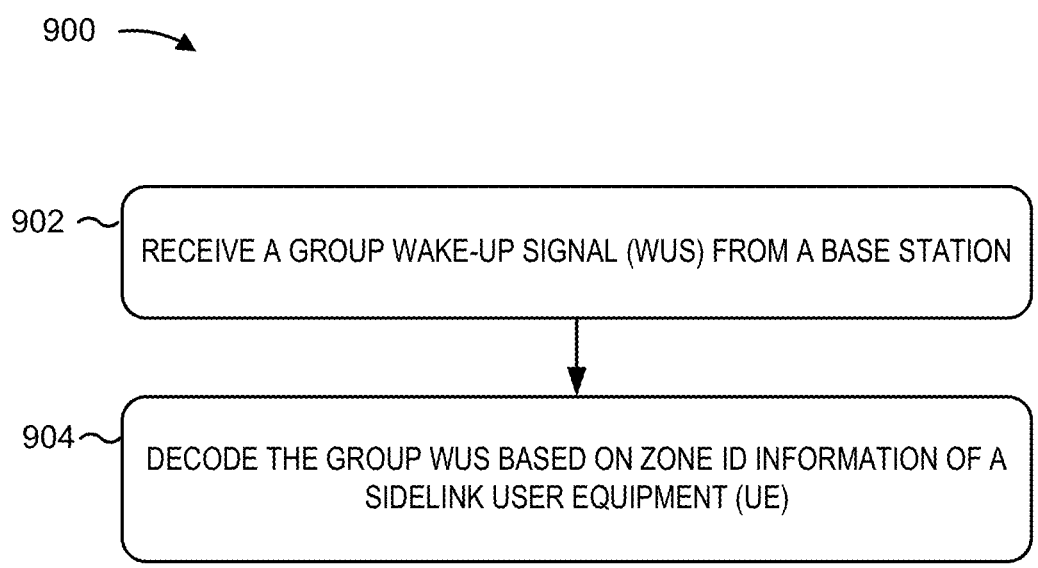
FIG. 9 is a flow diagram illustrating an example process performed, for example, by a sidelink user equipment, in accordance with various aspects of the present disclosure.

FIG. 9 is a diagram illustrating an example process 900 performed for example, by a user equipment (UE), in accordance with various aspects of the present disclosure. The example process 900 is an example use of a zone ID for wireless sidelink communications. As shown in FIG. 9, in some aspects, the process 900 may include receiving a group wake-up signal (WUS) from a base station (block 902). For example, the UE, for example, using the antenna 352, RX/TX 354, RX processor 356, controller/processor 359, and/or memory 360, receives a group wake-up signal (WUS). The process 900 may also include decoding the group WUS based on zone ID information of the sidelink UE (block 904). For example, the UE, for example, using the antenna 352, RX/TX 354, RX processor 356, controller/processor 359, and/or memory 360, may decode the group WUS.

Figure 10:
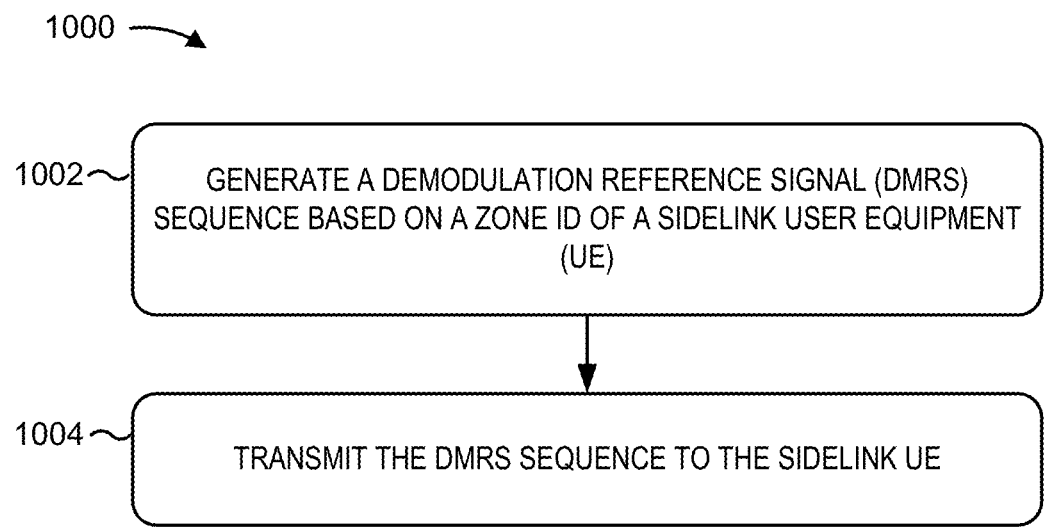
FIG. 10 is a flow diagram illustrating an example process performed, for example, by a base station, in accordance with various aspects of the present disclosure.

FIG. 10 is a diagram illustrating an example process 1000 performed for example, by a base station, in accordance with various aspects of the present disclosure. The example process 1000 is an example use of a zone ID for wireless sidelink communications. As shown in FIG. 10, in some aspects, the process 1000 may include generating a demodulation reference signal (DMRS) sequence based on a zone ID of a sidelink user equipment (UE) (block 1002). For example, the base station, e.g., using controller/processor 375, and/or memory 376, may generate a demodulation reference signal (DMRS) sequence. The process 1000 may also include transmitting the DMRS sequence to the sidelink UE (block 1004). For example, the base station, e.g., using the antenna 320, TX/RX 318, TX processor 316, controller/processor 375, and/or memory 376, may transmit the DMRS sequence to the sidelink UE.

Figure 11:
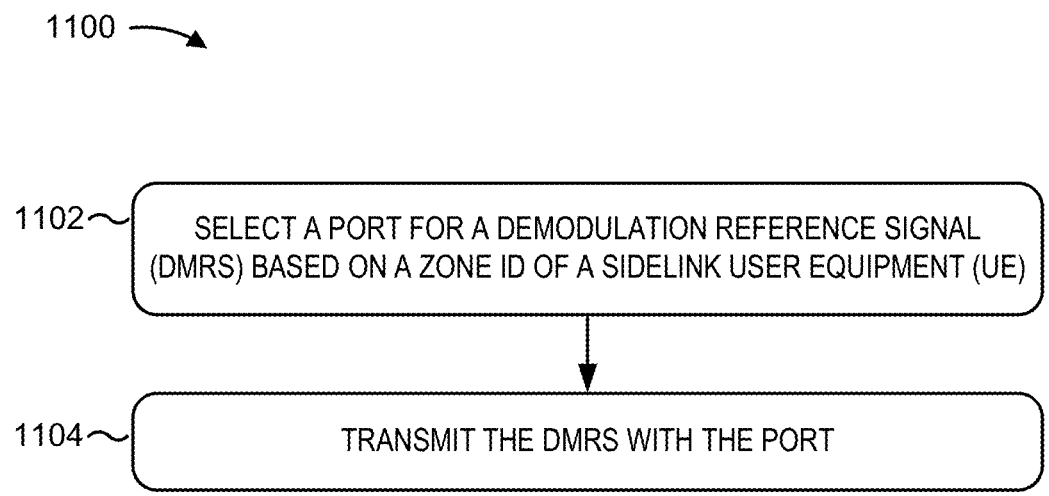
FIG. 11 is a flow diagram illustrating an example process performed, for example, by a base station, in accordance with various aspects of the present disclosure.

FIG. 11 is a diagram illustrating an example process 1100 performed for example, by a base station, in accordance with various aspects of the present disclosure. The example process 1100 is an example use of a zone ID for wireless sidelink communications. As shown in FIG. 11, in some aspects, the process 1100 may include selecting a port for a demodulation reference signal (DMRS) based on a zone ID of a sidelink user equipment (UE) (block 1102). For example, the base station, e.g., using the controller/processor 375, and/or memory 376, may select a port for a demodulation reference signal (DMRS). The process 1100 may also include transmitting the DMRS with the port (block 1104). For example, the base station, e.g., using the antenna 320, TX/RX 318, TX processor 316, controller/processor 375, and/or memory 376, may transmit the DMRS with the port.

Figure 12:
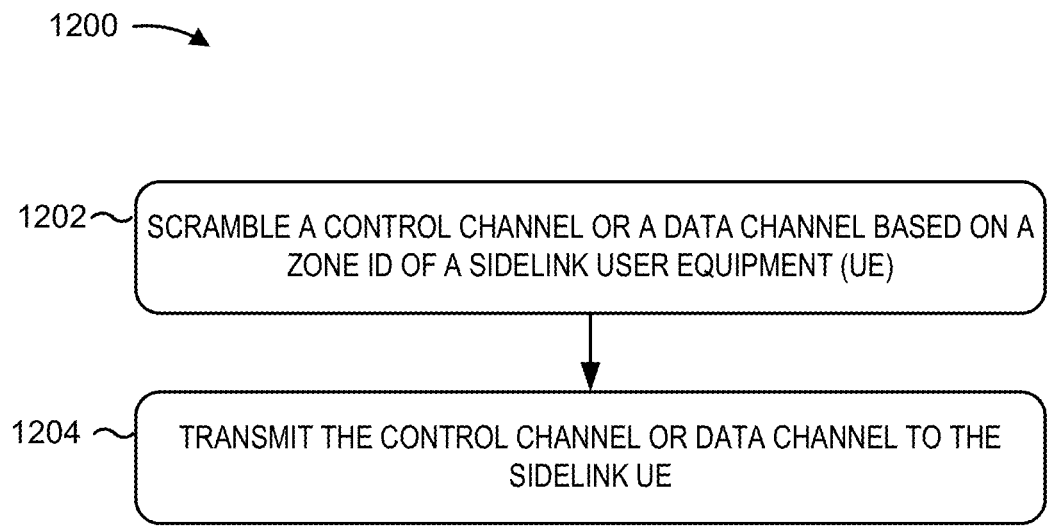
FIG. 12 is a flow diagram illustrating an example process performed, for example, by a base station, in accordance with various aspects of the present disclosure.

FIG. 12 is a diagram illustrating an example process 1200 performed for example, by a base station, in accordance with various aspects of the present disclosure. The example process 1200 is an example use of a zone ID for wireless sidelink communications. As shown in FIG. 12, in some aspects, the process 1200 may include scrambling a control channel or a data channel based on a zone ID of a sidelink user equipment (UE) (block 1202). For example, the base station, e.g., using the controller/processor 375, and/or memory 376, may scramble a control channel or a data channel based on a zone ID of a sidelink UE. The process 1200 may also include transmitting the control channel or data channel to the sidelink UE (block 1204). For example, the base station, e.g., using the antenna 320, TX/RX 318, TX processor 316, controller/processor 375, and/or memory 376, may transmit the control channel or data channel to the sidelink UE.

Figure 13:
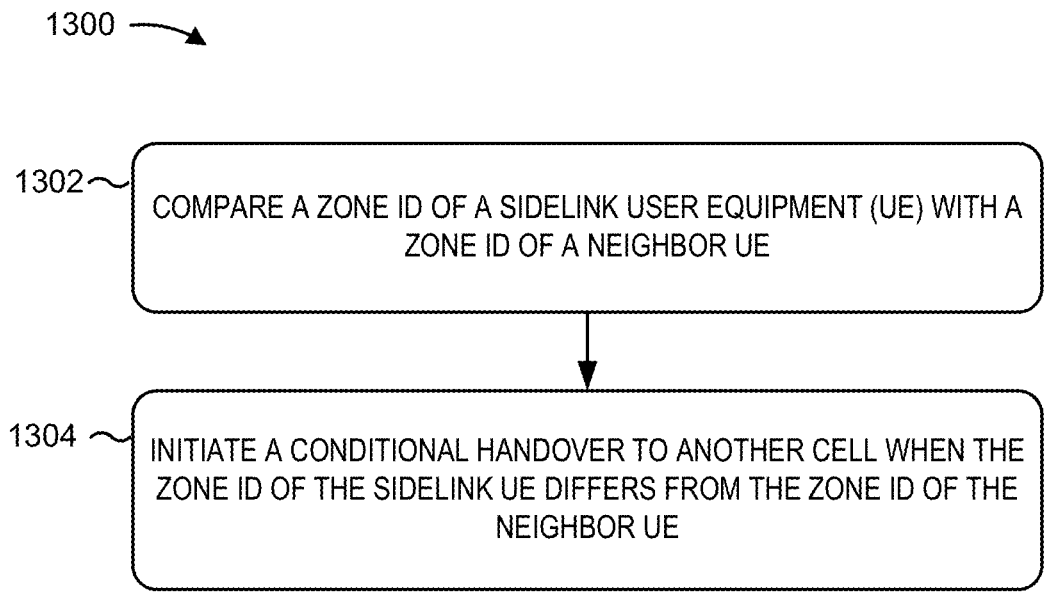
FIG. 13 is a flow diagram illustrating an example process performed, for example, by a sidelink user equipment, in accordance with various aspects of the present disclosure.

FIG. 13 is a diagram illustrating an example process 1300 performed for example, by a user equipment (UE), in accordance with various aspects of the present disclosure. The example process 1300 is an example use of a zone ID for wireless sidelink communications. As shown in FIG. 13, in some aspects, the process 1300 may include comparing a zone ID of a sidelink UE with a zone ID of a neighbor UE (block 1302). For example, the user equipment, e.g., using the antenna 352, RX/TX 354, RX processor 356, TX processor 368, controller/processor 359, and/or memory 360, may compare a zone ID of the sidelink UE. The process 1300 may also include initiating a conditional handover to another cell when the zone ID of the sidelink UE differs from the zone ID of the neighbor UE (block 1304). For example, the UE, e.g., using the antenna 352, RX/TX 354, RX processor 356, TX processor 368, controller/processor 359, and/or memory 360, may initiate a conditional handover to another cell.

Implementation examples are described in the following numbered clauses:

1. A method of wireless communication by a sidelink user equipment (UE), comprising:
   receiving a group wake-up signal (WUS) from a base station; and
   decoding the group WUS based on zone identification (ID) information of the sidelink UE.
2. The method of clause 1, further comprising receiving the zone ID information in a physical downlink control channel (PDCCH) payload.
3. The method of either clause 1 or 2, further comprising receiving the zone ID information by descrambling a portion of a cyclic redundancy check (CRC) code with the zone ID information.
4. The method of any of the preceding clauses, further comprising receiving the group WUS based on a search space and time location that is a function of the zone ID information.
5. The method of any of the preceding clauses, in which the zone ID information includes zone IDs from contiguous zones.
6. The method of any of the preceding clauses, in which the sidelink UE is in coverage from a cell different than one other sidelink UE receiving the group WUS.
7. The method of any of the preceding clauses, further comprising decoding the group WUS based on common UE parameters in addition to the zone ID information.
8. A method of wireless communication by a base station, comprising:
   applying a zone identification (ID) of a sidelink user equipment (UE) for at least one of selection of a demodulation reference signal (DMRS) port, generation of a DMRS sequence, or a scrambling operation; and
   communicating with the sidelink UE based on the zone ID.
9. The method of clause 8, in which the scrambling operation comprises scrambling a data channel based on the zone ID.
10. The method of clause 8 or 9, in which the scrambling operation comprises scrambling a control channel based on the zone ID.
11. A method of wireless communication by a sidelink user equipment (UE), comprising:
    comparing a zone identification (ID) of the sidelink UE with a zone ID of a neighbor UE; and
    initiating a conditional handover to a different cell when the zone ID of the sidelink UE differs from the zone ID of the neighbor UE.
12. The method of clause 11, further comprising initiating the conditional handover when a signal strength of the neighbor UE's communications with the sidelink UE is greater than a threshold.

13. The method of any of clauses 11 or 12, further comprising initiating the conditional handover when a signal strength of the neighbor UE is greater than a threshold.
14. An apparatus for wireless communications at a sidelink user equipment (UE), comprising:
   a processor;
   memory coupled with the processor; and
   instructions stored in the memory and operable, when executed by the processor, cause the apparatus:
      to receive a group wake-up signal (WUS) from a base station; and
      to decode the group WUS based on zone identification (ID) information of the sidelink UE.
15. The apparatus of clause 14, in which the processor causes the apparatus to receive the zone ID information in a physical downlink control channel (PDCCH) payload.
16. The apparatus of either clause 14 or 15, in which the processor causes the apparatus to receive the zone ID information by descrambling a portion of a cyclic redundancy check (CRC) code with the zone ID information.
17. The apparatus of any of clauses 14-16, in which the processor causes the apparatus to receive the group WUS based on a search space and time location that is a function of the zone ID information.
18. The apparatus of any of clauses 14-17, in which the zone ID information includes zone IDs from contiguous zones.
19. The apparatus of any of clauses 14-18, in which the sidelink UE is in coverage from a cell different than one other sidelink UE receiving the group WUS.
20. The apparatus of any of clauses 14-19, in which the processor causes the apparatus to decode the group WUS based on common UE parameters in addition to the zone ID information.
21. An apparatus for wireless communications by a sidelink user equipment (UE), comprising:
   a processor;
   memory coupled with the processor; and
   instructions stored in the memory and operable, when executed by the processor, cause the apparatus:
      to compare a zone identification (ID) of the sidelink UE with a zone ID of a neighbor UE; and
      to initiate a conditional handover to a different cell when the zone ID of the sidelink UE differs from the zone ID of the neighbor UE.
22. The apparatus of clause 21, in which the processor causes the apparatus to initiate the conditional handover when a signal strength of the neighbor UE's communications with the sidelink UE is greater than a threshold.
23. The apparatus of clause 21 or 22, in which the processor causes the apparatus to initiate the conditional handover when a signal strength of the neighbor UE is greater than a threshold.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described and in Appendix A may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:
1. A method of wireless communication by a sidelink user equipment (UE), comprising:
   receiving a group wake-up signal (WUJS) from a base station;
   decoding the group WUS based on a group WUS parameter that is a function of physical location-based zone identification (ID) information of the sidelink UE to align a sleep and/or wake up cycle with nearby UEs having same zone ID information, the group WUS parameter comprising a search space and time location for monitoring for the group WUS, which are a function of the physical location-based zone IID information of the sidelink UE; and
   communicating with another sidelink UE via sidelink communications.
2. The method of claim 1, further comprising receiving the zone ID information in a physical downlink control channel (PDCCH) payload.

3. The method of claim 1, further comprising receiving the zone ID information by descrambling a portion of a cyclic redundancy check (CRC) code with the zone ID information.

4. The method of claim 1, further comprising receiving the group WUS in the search space and time location for monitoring for the group WUS.

5. The method of claim 1, in which the zone ID information includes zone IDs from contiguous zones.

6. The method of claim 1, in which the sidelink UE is in coverage from a cell different than one other sidelink UE receiving the group WUS.

7. The method of claim 1, further comprising decoding the group WUS based on common UE parameters in addition to the zone ID information.

8. An apparatus for wireless communications at a sidelink user equipment (UE), comprising:
 a processor;
 memory coupled with the processor; and
 instructions stored in the memory and operable, when executed by the processor, cause the apparatus:
  to receive a group wake-up signal (WUS) from a base station; to decode the group WUS based on physical location-based zone identification (ID) information of the sidelink UE to align a sleep and/or wake-up cycle with nearby UEs having same zone ID information, the group WUS parameter comprising a search space and time location for monitoring for the group WUS, which are a function of physical location-based zone ID information of the sidelink UE; and
  to communicate with another sidelink UE via sidelink communications.

9. The apparatus of claim 8, in which the processor causes the apparatus to receive the zone ID information in a physical downlink control channel (PDCCH) payload.

10. The apparatus of claim 8, in which the processor causes the apparatus to receive the zone ID information by descrambling a portion of a cyclic redundancy check (CRC) code with the zone ID information.

11. The apparatus of claim 8, in which the processor causes the apparatus to receive the group WUS in the search space and time location for monitoring for the group WUS.

12. The apparatus of claim 8, in which the zone ID information includes zone IDs from contiguous zones.

13. The apparatus of claim 8, in which the sidelink UE is in coverage from a cell different than one other sidelink UE receiving the group WUS.

14. The apparatus of claim 8, in which the processor causes the apparatus to decode the group WUS based on common UE parameters in addition to the zone ID information.

* * * * *